United States Patent [19]
Page et al.

[11] Patent Number: 6,075,910
[45] Date of Patent: Jun. 13, 2000

[54] METHOD AND APPARATUS FOR CONTROLLING AN ELECTRO-OPTICAL SWITCH

[75] Inventors: Jerry L. Page, Alto; Daniel L. Sugarbaker, Ada, both of Mich.

[73] Assignee: Honeywell Inc., Minneapolis, Minn.

[21] Appl. No.: 08/685,355

[22] Filed: Jul. 24, 1996

Related U.S. Application Data

[63] Continuation of application No. PCT/US94/00931, Jan. 25, 1994.

[51] Int. Cl.[7] .............................. G02B 6/26; G01B 9/02
[52] U.S. Cl. ................................. 385/17; 385/16; 385/20; 385/24; 356/350
[58] Field of Search ............................ 385/17, 1–4, 16, 385/20, 24; 356/350

[56] References Cited

U.S. PATENT DOCUMENTS

| | | | |
|---|---|---|---|
| 4,649,334 | 3/1987 | Nakajima | 323/299 |
| 4,828,389 | 5/1989 | Gubbin et al. | 356/350 |

FOREIGN PATENT DOCUMENTS

| | | |
|---|---|---|
| 63223615 | 9/1988 | Japan . |
| 1059220 | 3/1989 | Japan . |
| 4025819 | 1/1992 | Japan . |
| 0 581 459 A2 | 2/1994 | Japan . |

*Primary Examiner*—Phan T. H. Palmer
*Attorney, Agent, or Firm*—John G. Shudy, Jr.

[57] ABSTRACT

A control arrangement for minimizing optical leakage in a time-division, multi-stage electro-optical switch by the periodic adjustment of switching voltage levels. An optical detector connected to an idle port of the switch transmits a leakage signal which represents optical leakage in the switch in various configurations of the switch. The leakage signal is filtered by a low pass filter and sampled at a low rate. A processor stores the sampled data and periodically analyzes the data to determine the appropriate changes in the switching voltage levels for each of the stages of the switch to minimize optical leakage. An output circuit connected to the processor and the switch modifies a previously determined base voltage signals for each of the stages to incorporate the voltage level changes and applies the modified signals to the switch in the appropriate time slots.

19 Claims, 8 Drawing Sheets

METHOD AND APPARATUS FOR CONTROLLING AN ELECTRO-OPTICAL SWITCH

This is a continuation of International Application of Ser. No. PCT/US94/00931, filed Jan. 25, 1994.

BACKGROUND OF THE INVENTION

1. Field of Invention

This invention relates to electro-optical switches and more specifically to a system for controlling the voltage switching levels of an electro-optical switch array.

2. Description of the Related Art

Optical switch arrays are used in many different applications when it is desired to multiplex an optical signal along multiple paths. For example, it is known to use optical switch arrays in multiple-ring fiber-optic gyro (FOG) systems to direct the optical signal emitted from a single source to multiple rings and from the rings to a detector. Such arrays are reconfigured periodically by the selective application of electrical signals.

A FOG system is used to sense rotation of a vehicle (e.g., a spacecraft) about one or more axes of rotation, and outputs from the FOG system are used to provide navigation and flight control information for the vehicle. A typical FOG includes a laser source providing an optical signal and a multi-turn coil of optical fiber referred to as a fiber-optic ring. The optical signal is first applied to an optical beam splitter/combiner which provides two identical optical output signals, each of which is applied to one end of the fiber-optic ring. The two signals travel through the ring in opposite directions and are recombined at the beam splitter/combiner. Any rotation of the fiber-optic ring about its wound or longitudinal axis will result in a phase shift of the signals traveling through the ring. This phase shift is known as the Sagnac effect phase shift and is detected by analysis of the recombined signal from the splitter/combiner that is applied to an output detector.

A particular implementation of a FOG incorporating an optical switch array is described in U.S. Pat. No. 4,828,389 to Gubbins et al. issued May 9, 1989, which is incorporated by reference herein. The FOG described in that patent comprises three fiber-optic rings oriented along orthogonal axes representative of axes of rotation of the vehicle in which the FOG is used. In that arrangement, light from a single optical source is transmitted to a multi-port optical switch array which transmits the signal to the three separate rings, via separate beam splitters/combiners, on a time-shared basis. The optical switch array further functions to transmit the recombined signals on a time-shared basis from the three rings to a single optical detector.

The optical switch array described in the above-noted patent comprises three switching stages interconnected by optical channel waveguides. Each switching stage comprises a bi-directional electro-optical switch having two pairs of optical ports and two pairs of electrodes by which control voltages may be applied to the switch. The switches may be fabricated from a crystalline material, such as lithium niobate (LiNbO$_3$), the index of refraction of which changes as a voltage signal is applied to the crystal. The optical channel waveguides may be formed in the crystalline material by indifusion of a dopant such as titanium. By the proper application of appropriate voltage control signals to the electrodes, each switch may be set to a "cross" state in which a light beam is deflected in the switch, and a "bar" state in which the light beam is passed through the element without deflection. By selective application of control signals, controlling the cross and bar states of the individual switches, it is possible to transmit optical signals between optical ports of the switching array in each of a plurality of time slots. In the arrangement described in the Gubbins et al. patent, two separate optical paths are established in the switch array, in each time slot. One path allows for the transmission of a signal from a laser source to one of the fiber-optic rings and the other path allows for the transmission of a recombined signal from another of the rings to the output detector, in the same time slot. Since each stage of the switch array comprises two electrode pairs, six separate voltages must be applied to a three-stage array in each time slot. Since each switch may be placed in either the cross state or bar state, twelve different control voltages must be available for control of the three-stage switch array.

The application of voltage signals to the electrodes results in the establishment of electric fields which create the bar and cross states within the switch. The magnitude of an applied voltage at which an electro-optical switch assumes the bar state or the cross state is a function of the physical characteristics of the crystal element and may change with changes in environmental conditions, such as temperature, and other changing conditions such as charge migration and device life. It has been recognized that the application of a voltage signal of improper magnitude for either the cross state or the bar state may cause an optical signal to be partially blocked or misdirected. This phenomenon, referred to as "leakage," may result in a reduced magnitude or erroneous output signal from the switch and ultimately in erroneous flight control information. It is therefore desireable to minimize such leakage.

SUMMARY OF THE INVENTION

These and other problems of the prior art are overcome in accordance with the principles of this invention in which optical leakage in an electro-optical switch array, controlled by electrical control signals, is minimized by detecting a measure of optical output from the switch array in response to the application of control signals of a predetermined magnitude, modifying the magnitude of the control signals and comparing optical output detected in response to the application of the modified control signals with the output value detected prior to the modification. Thereafter the magnitude of the control signals are set equal to the value of the control signals which provides the better output value. In one particular embodiment of the invention, a plurality of samples of output signal values are taken in response to the application of control signals of the predetermined magnitude. Additional samples are taken in response to the application of the modified magnitude control signals and accumulated sample values are compared in order to avoid adjustment to control signals in response to short duration variations.

According to one aspect of the invention, the magnitude of one of the two control signals for a selected one of the switches is first modified by adding a predefined incremental value to the predetermined magnitude for that control signal and output signal samples are detected and corresponding sample values are stored. Thereafter, the other of the two control signals for the selected switch is modified by adding a predefined increment to the magnitude for the other control signal and output samples are again detected and corresponding sample values are stored. The output signal values obtained at the modified control signal magnitudes are examined and a determination is made as to the magnitude of the difference between the values of the output signal at the original predetermined magnitude of the control signals and at the modified magnitude of the control signals. Further modification of the control signals is made only if a significant change in output signal value is detected.

In accordance with another aspect of the invention, the magnitude of control signals is first varied by a predetermined amount and values corresponding to output samples are recorded as representing points on a leakage curve for the switch array. A gradient vector of the leakage curve is computed as a function of the control signal magnitudes and further samples of optical output signals are collected at the point on the leakage curve represented by newly computed values of control signal magnitudes. New control signal magnitude values are computed repeatedly until the optical output shows no further significant improvement over a prior reading. The signal magnitude values providing a less than significant change are used in deriving the magnitudes of the control signals for subsequent application to the selected switch.

In accordance with a particular aspect of the invention, the magnitudes of the control signals are selectively incremented by values computed by multiplying predetermined incremental values by a selected multiplier and the further step of periodically incrementing this selected multiplier and repeatedly collecting additional samples until the difference between successively collected samples is less than a predetermined threshold value and the further step of adjusting incremental control signal values as a function of the selected multiplier.

In accordance with one specific embodiment of the invention, an optical switch array is provided with a leakage detection output port and the magnitudes of the control signals supplied to the switching array are modified to minimize the optical output at the leakage detected port.

In accordance with another aspect of the invention, optical samples are taken from a primary optical output port of the switch array and the magnitudes of control signals are adjusted to maximize optical output at the primary output port.

Advantageously, in a system in accordance with the principles of this invention, optical leakage in an electro-optical switch is minimized by periodically varying the magnitude of the control signals to provide minimum leakage values and without interruption of normal switch operations.

In accordance with one aspect of the invention, an optical switching system comprises an optical leakage detector connected to an electro-optical switch array and system control circuitry responsive to optical leakage output signals to adjust the magnitude of control signals applied to the electro-optical switch array.

In one specific embodiment of the invention, a filter circuit is connected between the optical leakage detector and the control circuitry. The filter circuit filters electrical signals of greater than a predetermined frequency from electrical output signals generated by the leakage detector. In a further specific embodiment of the invention, the control signals for an electro optical switch are generated from a first signal source element generating output signals of a fixed magnitude and a second source element generating signals of a second variable magnitude. The variable magnitude is controlled by the control circuitry of the system and may be adjusted from time to time in response to electrical output signals representative of optical leakage.

BRIEF DESCRIPTION OF THE DRAWINGS

The invention will now be described with reference to the drawings in which.

DETAILED DESCRIPTION

Figure 1:
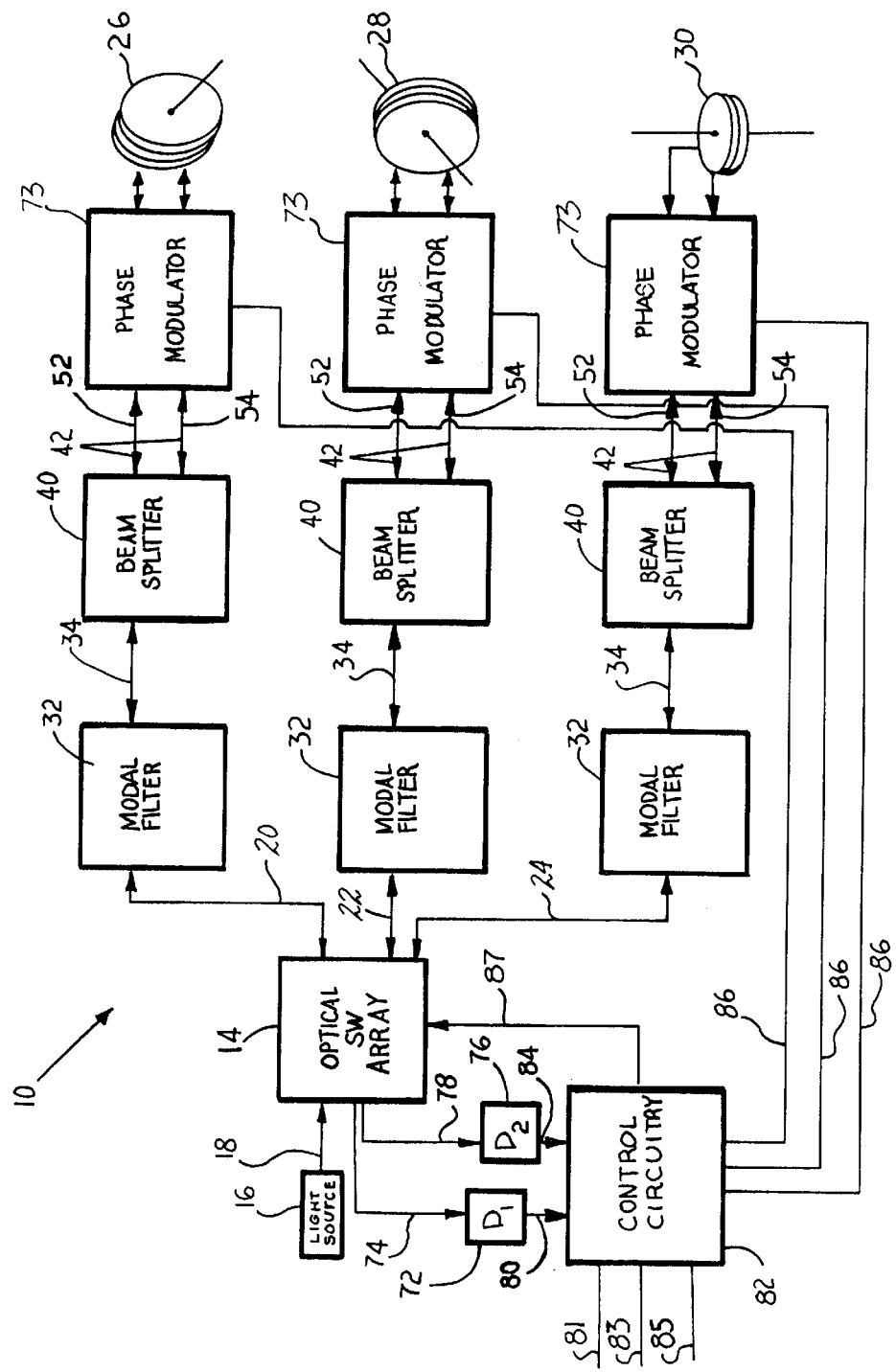
FIG. 1 is a block diagram of a fiber-optic gyro system which incorporates principles of the invention.

FIG. 1 illustrates an exemplary embodiment of a fiber-optic gyro system (FOG) 10 including three fiber-optic rings 26, 28 and 30, optically connected to a light source 16, a primary photodetector 72, and a secondary leakage detector 76 via an electro-optical switch array 14. The light source 16 may be a standard laser light source providing an optical signal S which is transmitted on optical conductor 18 and through optical switch array 14 to three optical conductors 20, 22 and 24 in a timed sequence. The optical conductor 20 is connected through a modal filter 32, optical conductor 34, a beam splitter 40 and an optical path 42 via a phase modulator 73 to fiber-optic ring 26. In a similar fashion, optical conductor 22 is optically connected to fiber ring 28, and optical conductor 24 is optically connected to fiber ring 30, through a modal filter 32, an optical conductor 34, a beam splitter 40, an optical path 42 and a phase modulator 73. The modal filters 32, beam splitters 40 and phase modulators 73 are well-known devices and their operation is discussed in detail in the above-noted Gubbins et al. patent, which is incorporated by reference herein.

Briefly summarized, the operation of the FOG 10 is generally as follows: an optical signal S is generated by the light source 16 and transmitted via optical conductor 18 to the optical switch array 14. The signal S is further transmitted by the optical switch array 14 to the three optical conductors 20, 22 and 24 in a timed sequence. The optical signal on one of these conductors, e.g., optical conductor 20, is modified by means of the modal filter 32 to provide an outgoing optical signal comprising only one polarization state of one spacial mode to reduce thermal and pressure-induced phase errors. The resultant signal is transmitted via optical conductor 34 to the beam splitter 40 which generates two identical optical signals on separate conductors 52, 54. One of the two signals will be transmitted to the fiber ring 26 in the clockwise direction and the other will be transmitted in the counterclockwise direction. The two signals are passed through a phase modulator 73 before being applied to the fiber ring 26. In the same manner, optical signal conductors 22 and 24 are transmitted to fiber coils 28 and 30, respectively.

Signals returned from the fiber rings 26, 28 and 30 are recombined at the beam splitters 40 and pass through modal filters 32 to the conductors 20, 22 and 24, respectively. The optical switch array 14 functions to connect the conductors 20, 22 and 24 to a primary photodetector 72 in sequence. The photodetector 72 may be a well-known optical detector which is responsive to an optical signal to generate an electrical output signal proportional to the optical signal.

The control circuitry 82 analyzes the electrical signal from the primary photodetector 72 and determines the direction and magnitude of the Sagnac phase shift from the detected signal and generates output signals on electrical conductors 81, 83 and 85 indicative of rotation of the fiber rings 26, 28 and 30, respectively, about their respective axes of rotation. The control circuitry 82 further generates control signals for each of the phase modulators 73. The magnitude and direction of the phase shift to be applied to each of the signals by the phase modulator 73 is derived by the control circuitry 82 on the basis of the output signals received from the photodetector 72, in a well-known fashion.

The secondary leakage detector 76 is connected to the optical switch array 14 by means of optical conductor 78 and to the control circuitry 82 by means of electrical conductor 84. Leakage detector 76, like detector 72, may be a well-known device responsive to an optical signal to generate an electrical output signal proportional to the optical signal. The function of leakage detector 76 is to detect optical leakage signals and to provide a corresponding indication to the control circuitry 82. Control circuitry 82 is connected to optical switch array 14 by means of a control cable 87 comprising a plurality of individual conductors for transmitting signals to control the sequential establishment of optical connections within the array. As will be described further herein with reference to FIGS. 2–4, the control circuitry 82 generates appropriate switch array control signals with reference to the output signal of leakage detector 76.

As described in the aforementioned Gubbins et al. patent, the optical switch array 14, the modal filters 32, the beam splitters 40, and the phase modulators 73, shown in FIG. 1, may be integrated on to a single integrated chip comprising a lithium niobate crystal. With the use of conventional techniques, various waveguides can be formed in the crystal by the indifusion of titanium along defined paths, thereby forming waveguides for the appropriate transmittal of light waves. Electrodes may be added on top of a passivation or insulating layer deposited on the lithium niobate crystal in the area which defines the switch array 14. A potential applied between a pair of electrodes establishes an electric field in the crystal between the electrodes. By selective application of the field, an optical beam may be directed through the switch array in a known, controlled manner.

Figure 2:
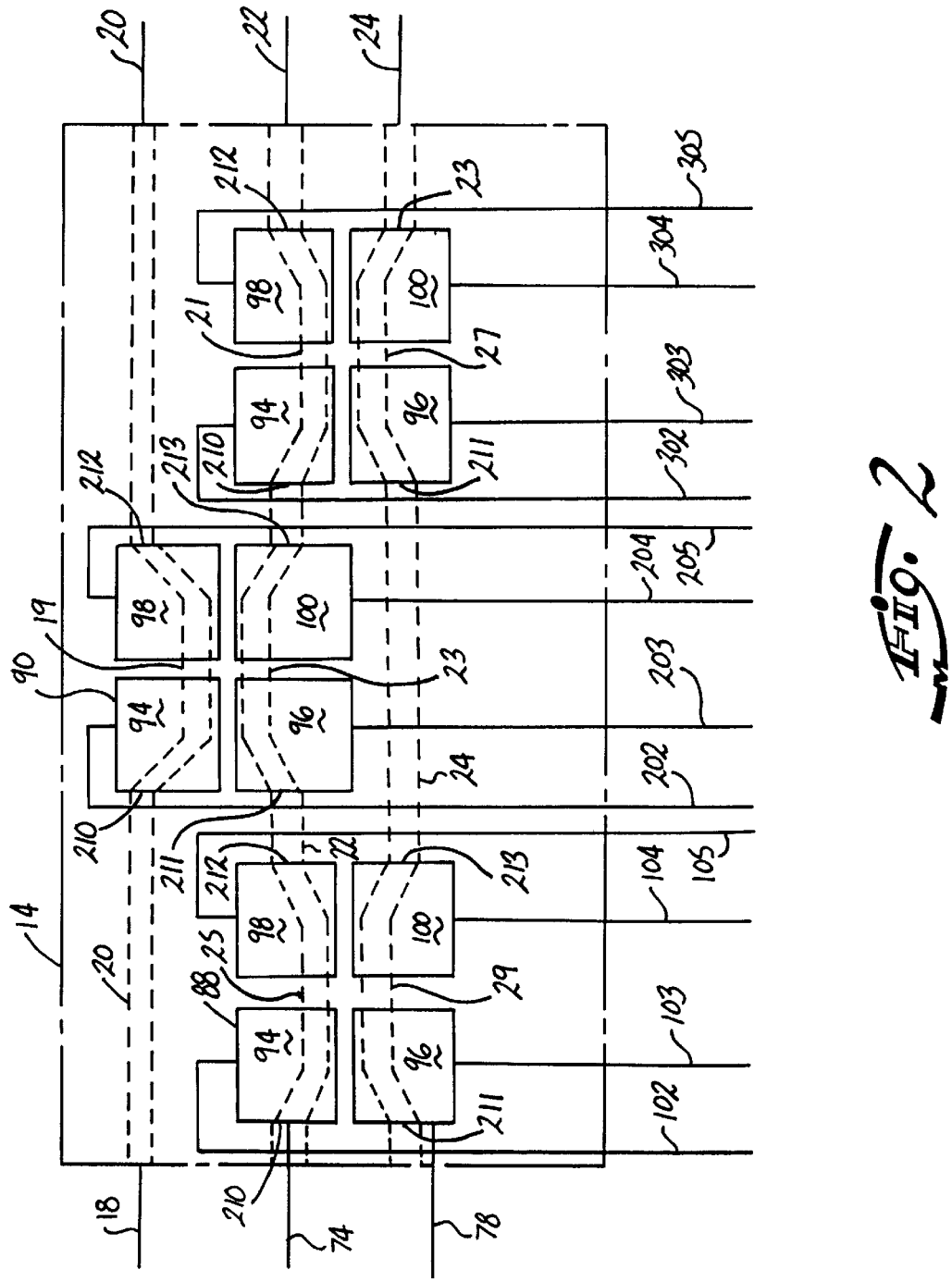
FIG. 2 is a block diagram of the electro-optical switch array illustrated in FIG. 1.

FIG. 2 depicts an area of an integrated chip comprising the optical switch array 14 which includes three electro-optical switches 88, 90, and 92. Each of the switches is provided with two pairs of electrodes, 94, 96 and 98, 100. Separate control voltage signals are applied to each electrode pair from the control circuitry 82 via conductors 102–105, 202–205, and 302–305. Three optical waveguides 20, 22, and 24 (shown as optical conductors in FIG. 1) extend through the switch array 14 and to modal filters 32. Each of the waveguides extends through at least one of the areas defining the optical switches 88, 90, and 92 and are provided with offset sections 19, 21, 23, 25, 27, and 29 within the areas of the switches. By means of the offset sections, each waveguide is placed in close proximity to another waveguide in an area of the switches referred to as evanescent coupling regions. Each of the switches 88, 90, and 92 has two operational states known as the bar state and the cross state. By the selective application of control signals of appropriate voltage levels to each of the electrode pairs 94, 96 and 98, 100, each of the switches 88, 90, and 92 may be selectively placed in either the cross state or the bar state. Applying voltages across the electrode pairs creates an electric field in the vicinity of each pair which alters the light propagation velocity (refractive index) in the region of the field, thereby causing either an in-phase or out-of-phase condition within the evanescent coupling region. By proper selection of the voltage levels for the signals applied to the electrodes, an in-phase, cross-coupling condition, referred to as the cross state, or an out-of-phase, non-coupling condition, referred to as the bar state, can be created in the evanescent coupling region.

Each of the electro-optical switches 88, 90, and 92 has four ports 210, 211, 212, and 213, and the switches are bi-directional such that, for example, in the arrangement of FIG. 2, an optical signal may enter from either the left side or the right side of array 14 and exit on the opposite side. In the bar state, an input signal on one of the two ports on one side (e.g., 210) is transmitted to the port on the other side (e.g., 212) which is in alignment with the one port on the one side (e.g., 210). In the cross state, an optical input signal applied to one of the two ports on one side (e.g., 210) will be transmitted to the port on the other side (e.g., 213) which is in alignment with the other of the two ports on the one side (e.g., 211).

In the optical switch array 14, as illustrated in FIG. 2, the optical switches 88 and 92 are in substantially linear alignment and optical switch 90 is positioned between optical switches 88 and 92 and displaced from the linear alignment of switches 88 and 92. This arrangement allows an optical signal from the light source 16 on optical conductor 18 to be directed through switch array 14 via optical waveguide 20 when switch 90 is in the bar state. Furthermore, when switch 90 is in the cross state, an optical signal on optical conductor 18, entering switch array 14 via waveguide 20, is coupled to waveguide 22 in switch 90 and exits switch array 14 on waveguide 22, if switch 92 is in the bar state. In an analogous fashion, an optical signal arriving from optical fiber ring 26 on optical waveguide 20 is coupled to waveguide 22 and transmitted to optical conductor 74 when switch 90 is in a cross state and switch 88 is in the bar state. Similarly, an optical signal arriving on waveguide 22 from optical ring 28 is transmitted to conductor 74 when optical switches 88, 90, and 92 are in the bar state. An optical signal arriving from optical fiber ring 30 on waveguide 24 is transmitted to conductor 74 when switch 88 is in the cross state and switch 92 is in a bar state.

In the arrangement of FIG. 1, the switch array 14 is activated in such a manner that one light signal is transmitted from the light source 16 to one of the fiber rings 26, 28, or 30 while recombined light from another of the three fiber rings is transmitted through the switch to the primary photodetector 72 (D1) in the same time slot. Leakage detector 76 (D2) is provided to detect optical leakage and none of the recombined optical signals returned from the fiber cores is intentionally switched to leakage detector 76. When one of the switches 88, 90, 92 is "on" with respect to one of its operational states, e.g. the bar state, it is "off" with respect to the other operational state. Ideally, all light entering a port of the switch will exit from an intended port, in accordance with the operational state of the switch. However, a portion of incoming light may be diverted to an unintended port as a result of leakage within the switch. The ratio of the light diverted to an unintended port to the light transmitted to the intended port is called the extinction ratio. This ratio is a function of the physical characteristics of the switch but may be controlled to a large extent by the applied voltage signal. The extinction ratio tends to vary with changes in environmental conditions, such as temperature. In accordance with the principles of this invention the leakage detector 76 provides an indication of the magnitude of leakage. As described further below with reference to FIGS. 3 through 5, the output of leakage detector 76 is used to vary the voltages applied to the individual electrodes of switches 88, 90 and 92 in order to minimize leakage and reduce errors due to leakage.

Figure 3:
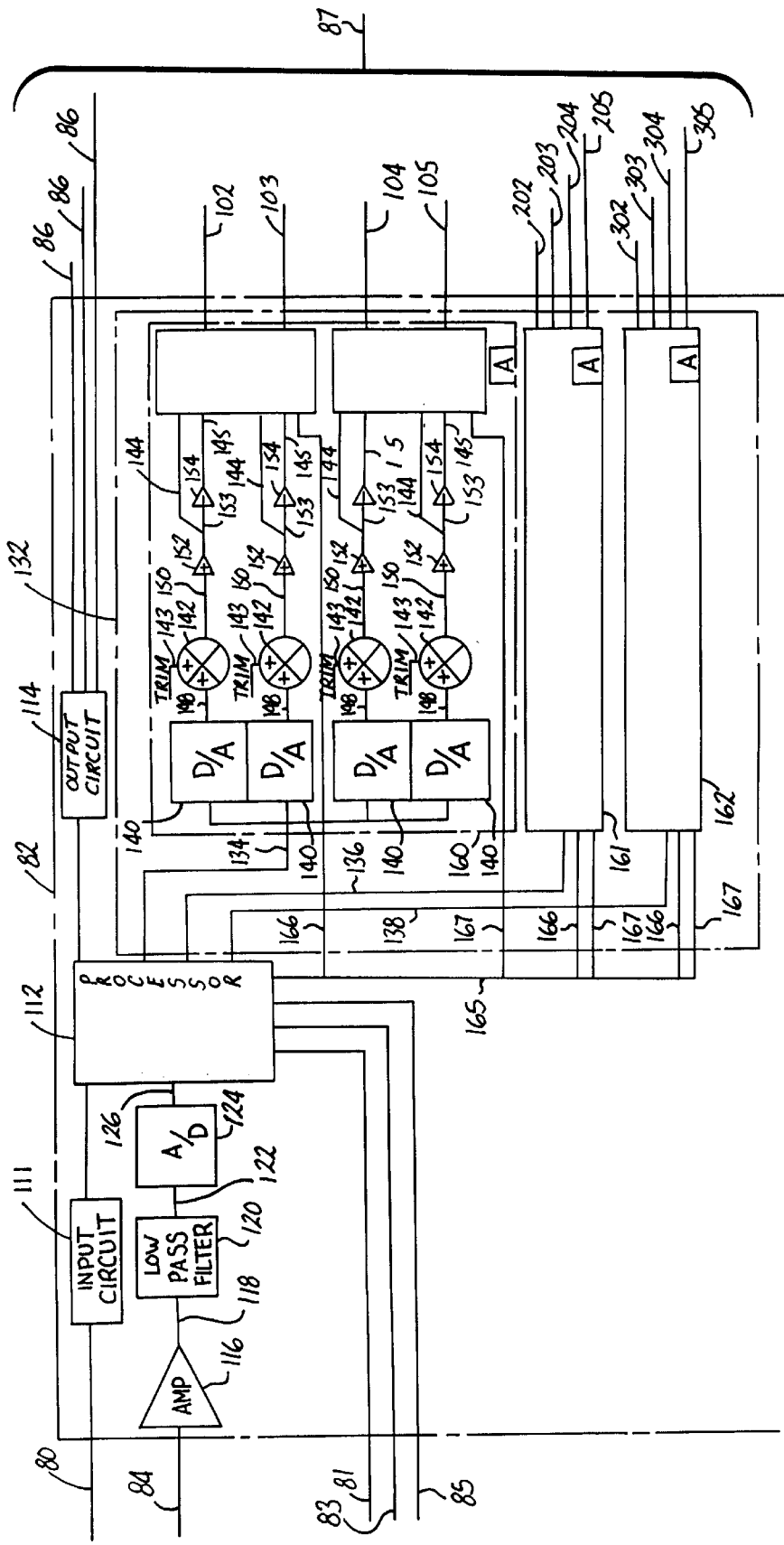
FIG. 3 is a block diagram of the switching voltage control circuitry of FIG. 1.

FIG. 3 is more detailed block diagram of the control circuitry 82 shown in FIG. 1. As mentioned earlier, detectors 72 and 76 shown in FIG. 1 may be well-known optical detectors which generate an electrical output signal representative of the received optical signal. The output signal from detector 72 is transmitted via electrical conductor 80 to control circuitry 82 and more specifically to the input circuit 111 of control circuitry 82. The input circuit 111 provides the necessary amplification, filtering, modulation and multiplexing functions as described in the above-noted Gubbins et al. patent, to generate a phase error signal, integrated over time, for each of the three optical rings. The processor 112 employs output signals from input circuit 111 to generate, in a well-known fashion, vehicle attitude reference signals on the electrical conductors 81, 83, and 85, indicative of vehicle rotation detected from the three fiber rings. The processor 112 further uses signals from the input circuit 111 to generate phase modulator control signals in a well-known manner, which are transmitted to output circuit 114. This circuit performs functions such as a digital-to-analog conversion and other signal conditioning functions as described for example in the above-noted Gubbins et al. patent. The analog output signals are transmitted from output circuit 114 on a set of three conductors 86 for the control of phase modulators 73 shown in FIG. 1.

As shown in FIG. 3, the control circuit 82 further receives an input signal on conductor 84 which is connected to leakage detector 76 (D2), shown in FIG. 1. As mentioned earlier herein, the purpose of the leakage detector 76 is to detect leakage within the optical switch array 14. It may be a standard photo-detector which generates an electrical analog signal representative of the received optical signal. The control circuitry 82 uses this signal from leakage detector 76 to optimize the switching voltages applied to the optical switches 88, 90, and 92. As will be explained further herein, the nominal or trim voltage for controlling each of these optical switches are preferably determined empirically since it is a function of the crystal material from which the switching array is constructed as well as the particular crystal cut. The electro-optic coefficient of the crystal tends to change with temperature, and the degree of change is a function of temperature stability of the crystal which may also vary with the crystal cut. Hence, the voltage levels for optimum switching can also be expected to change with temperature and leakage in the switch can be expected to vary with changes in environmental conditions. To compensate for such changes, leakage in the switch is monitored over time, and the signals applied to the switches are modified from time to time, computed on the basis of switch leakage, to the empirically determined trim voltages.

As mentioned earlier, the optical switch array 14 is reconfigured on a timed basis in order to conduct optic signals from the light source 16 (FIG. 1) to the three fiber rings in sequence and to conduct optical signals returning from the three rings to the primary detector 72. Particularly, the switch is configured such that an optical signal from the source is conducted to one of the fiber rings while a returning optical signal is conducted to the detector 72 from another of the fiber rings in the same time slot. The switching frequency is timed to permit multiplexing the input and output optical signal pulses across the desired optical paths in the switch. Such a frequency is a function of the time required for an optical pulse to transit the switch and optical fiber ring.

An optical signal transmitted from the optical switch array 14 to one of the optical rings 26, 28, 30, shown in FIG. 1, is returned to the switch array after a period of time π. Such an optical signal transmitted to an optical ring may originate from the source 16 on optical conductor 18 or may be the result of leakage within the switch array 14. Leakage may originate in the optical switch from a portion of the source pulse being misdirected to another coil and returning, or leakage may originate in the optical switch from a portion of the return pulse being misdirected to an unintended optical path. A return signal, corresponding to a previously transmitted source signal, will be directed to the primary detector 72 of optical conductor 74. A return signal due to leakage must be directed to the leakage detector 76, via conductor 78, in order to be recognized as a leakage signal.

In this illustrative embodiment, the optical switch array 14 is controlled such that the source signal is transmitted to optical ring 26 via waveguide 20, and a return signal from optical ring 30 is received on waveguide 24 and directed to the primary detector 72 via optical conductor 74. This may be accomplished by placing switch 88 in the cross state and switches 90 and 92 in the bar state or by placing switch 92 in the cross state and placing switches 88 and 90 in the bar state. In the next time slot, the source signal on conductor 18 is transmitted to optical ring 28 via waveguide 22, and the return signal from optical ring 26 is directed to detector 72 via waveguide 22 and optical conductor 74. This may be accomplished by placing switch 90 in the cross state and switches 88 and 92 in the bar state. In a third time slot, the source signal on conductor 18 is transmitted to fiber-optic ring 30 via waveguide 24, and the return signal from fiber-optic ring 28 is transmitted to detector 76 via waveguide 22 and optical conductor 78. This is accomplished by placing all three of the switches 88, 90, and 92 in the cross state. By analysis of the switching configurations in the three time slots, it can be determined that optical leakage signals resulting from leakage in switches 88, 90, and 92 in the cross state and switches 88 and 92 in the bar state will be directed to the leakage detector 76. Optical leakage signals resulting from leakage in switch 90 in the bar state may be detected by using an alternate switching configuration in the first time slot, namely, the configuration in which switches 88 and 90 are in the bar state and switch 92 is in the cross state with all three of the switches in the second and third time slots in the configuration discussed above. Therefore, it is desirable to alternatively use the two different configurations of switches in the first time slot to assure detection of leakage from each of the switches in both of their operational states. The switching patterns are alternated at a relatively low frequency, for example, 200 hertz. For the purposes of leakage analysis, any leakage signal which may result from another leakage signal is considered to be of such a small magnitude that it can be safely ignored.

The electrical output from optical leakage detector 76 is transmitted to the control circuitry 82 via conductor 84 and amplified by means of amplifier 116, preferably a well-known transimpedance amplifier, and applied via electrical conductor 118 to a low pass filter 120 having a cut-off at a low frequency such as 1 kilohertz. The resultant filtered output signal is applied via electrical conductor 122 to an A-D convertor 124 at a sampling rate of 25 hertz and is converted to digital signals representative of the filtered signal. The digital signal is applied via electrical conductor 126 to the processor 112, which functions to minimize the signal by varying the control signals applied to the switches 88, 90, and 92.

The processor 112 is a standard program controlled processor which stores the digital samples of the filter output signal received from the A-D convertor 124 and periodically generates a plurality of digital outputs, each defining a control voltage to be applied to one pair of the electrodes (e.g., 94, 96) of the switches 88, 90 and 92. Since the switch array 14 comprises three switches (FIG. 2) and each switch comprises two pairs of electrodes 94, 96 and 98, 100, six electrical signals are generated in each time slot of the switch array 14. Since each of the switches 88, 90, and 92 may assume the bar state or the cross state, 12 separate signal values must be provided. The digital outputs from processor 112 are converted by means of output circuit 132 to generate the appropriate voltage signals on the 12 conductors 102–105, 202–205 and 302–305 connected to the various electrodes in switch array 14.

FIG. 3 shows a particular embodiment of the output circuit 132. In that embodiment, the signal from the processor 112 does not represent the complete magnitude of the signal to be applied to each electrode but rather only an incremental correction value. This value is added to or subtracted from a previously-established trim signal value for each of the electrode pairs. The digital incremented correction signals from the processor 112 are separately applied via multi-wire cables 134, 136 and 138, to three separate sets of D-A convertors 140 in block 160, 161, and 162, respectively. Each of the three separate sets comprises four D-A convertors as depicted in block 160 of FIG. 3. Blocks 160, 161 and 162 contain identical circuitry. For the sake of simplicity, only the circuitry of block 160 will be described, it being understood that the description applies equally to blocks 161 and 162.

The outputs of the four convertors 140 are applied to individual analog summing circuits 142 and the output from A-D convertor conductor 148 is combined with the previously established trim signal on the conductors 143. The values of the trim signals on conductors 143 are empirically determined for the bar state and the cross state for each of the separate electrode pairs of the switching array 14. These signals are typically in the range of ±12 volts and are provided from a separate voltage supply circuit (not shown in the drawings). The signals from the D-A convertors 140, and appearing on conductors 148, represent the incremental correction signals, typically in the range of ±2.5 volts and derived from the leakage signal obtained from detector 76, in a manner described later herein with reference to FIGS. 4 through 9. The output of each of the summing circuits 142 is transmitted via conductor 150 to an amplifier 152 which produces a corresponding output signal on one of the conductors 153. The signals on the conductors 153 are inverted by inverters 154, and in each case, the true signal on conductor 144 and its inverse on conductor 145 are applied to voltage switchers 146. Switchers 146 generate both positive and negative polarity signals which are applied to the electrode pairs 94, 96 and 98, 100 (FIG. 2) of switch 88, via conductors 102, 103 and 104, 105. Similarly, positive and negative polarity signals are applied to corresponding electrode pairs of switch 90 via conductors 202, 203, and 204, 205 and to electrode pairs of switch 92 via conductors 302, 303 and 304, 305.

The voltage switchers 146 are analog switching chips, such as the commercially available HARRIS HS 201 switching chip. The processor 112 provides a control signal to each of the switchers 146 via cable 165 and control conductors 166 and 167. These control signals control the voltage switchers 146 to generate output signals, representing bar state and cross state switch control signals for the electrode pairs 94, 96 and 98, 100 of the switches 88, 90, 92 (FIG. 2) to which the switchers 146 are connected via the conductors 102 through 105, 202 through 205 and 302 through 305. The state control signals applied to the switchers 146 from a high frequency timer, via cable 165, define whether the switch control signal to be generated is a cross state or a bar state signal and the signals on conductors 153 determine the magnitude of the signal to be applied. The state control signal on cable 165 are used to reconfigure the switches 88, 90 and 92 at the switching rate of the switch, typically at a frequency of 133 kilohertz. The signals on the conductors 153, however, change at a much slower rate and only when the incremental value of the signal from the D/A converters 140 is changed. The converters 140 may include digital or analog circuitry which store the last established value of the incremental correction signals and provide the converter output signals on conductors 148. This value is changed at a much slower frequency, such as 25 hertz, in connection with a procedure for adjusting the connection voltage to minimize leakage, as described later herein with reference to FIGS. 4 through 9.

FIG. 4–8 are a block diagram representation of functions performed by the processor 112 in controlling the voltages applied to electrode pairs 94, 96, and 98, 100 of switches 88, 90, and 92 shown in FIG. 2. Each of the electrode pairs 94, 96, and 98, 100 receives both a positive polarity and a negative polarity signal of the same magnitude. Since there are six electrode pairs within the optical switch array 14, six separate voltage signals must be generated at any one time. However, as explained earlier herein, each of the switches 88, 90, 92 has a bar state in which the light is conducted essentially straight through the switch and a cross state in which the light beams are crossed over within the switch. Separate voltages must be computed for the bar and the cross states. Accordingly, twelve separate voltages must be computed by the processor 112. As explained in connection with FIG. 3, the voltages to be applied to the individual switch elements are derived by adding an incremental voltage to an empirically established trim voltage. The incremental voltage is periodically adjusted by the processor 112 so as to minimize leakage in the optical switch array 14.

The individual voltages of each electrode pair 94, 96 and 98, 100 of each of the switches 88, 89, and 92 are controlled so as to assure that the switches are properly switched and to reduce switch leakage which tends to adversely affect the readout signal received by the processor 112 from primary detector 72. As explained earlier, the leakage is detected at secondary detector 76 shown in FIG. 1 and the pattern in which the individual switches are operated in order to establish optically conducting paths through the switch array 14 is changed periodically, at a 200 hertz rate, to enhance leakage detection. The program controlled processor 112 monitors the leakage signal received at leakage detector 76 at a selected rate, e.g. 25 times per second. This relatively slow rate was selected since leakage tends to change relatively slowly over time, particularly when compared to the other relevant times within the system such as the transit time of the light rays through the ring.

The processor 112 at the beginning of a leakage analysis sequence collects samples from the D2 leakage detector 76 on conductor 84 via amplifier 116, low pass filter 120 and the A-D converter 124, shown in FIG. 3. The low pass filter 120 filters out frequencies above 1 kilohertz. The processor 112 collects leakage samples over a period of time, for example two samples taken at the 25 hertz rate, and averages the two samples. Prior to the beginning of the leakage analysis sequence, each of the electrode pairs, i.e. the pairs 94, 96, and 98, 100 of switches 88, 90 and 92, has been receiving control signals of a previously determined voltage level at its normal cycling rate, e.g. at a 133 kilohertz. The values of the voltage settings at the beginning of the leakage analysis sequence are taken as a starting point and the samples are initially collected with the switches operated at these voltage settings. Subsequently, the initial voltages are individually modified to determine whether a significant change occurs in the leakage output as a result of the modification. In brief, and as described in more detail below, the processor 112 obtains a number of samples of the leakage detector 76 output for the two switch electrode pairs of a selected switch at different applied voltage levels. Based on these samples, a determination is made as to how the voltage should be varied, in order to minimize the output at the leakage detector 76. Alternatively, the applied voltages may be varied to maximize the output at the primary detector 72 instead of minimizing the output at the leakage detector 76.

Figure 8:
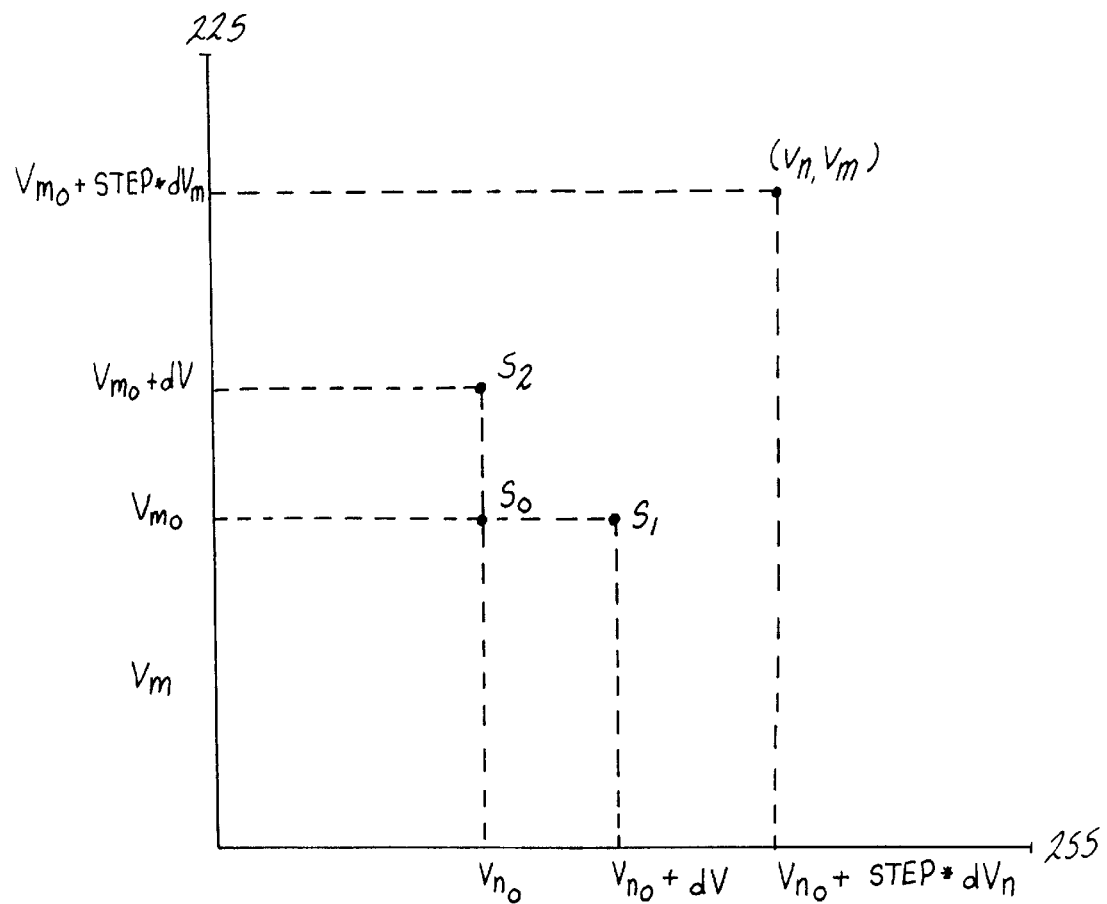
FIG. 8 is a diagrammatic plot of leakage values.

FIG. 8 is a graphical presentation of leakage detector output values as obtained at various levels of applied voltages. The vertical axis of FIG. 8 represents a voltage Vm applied to a first pair of electrodes (e.g. electrodes 94, 96) of a selected switch (e.g. switch 88) and the horizontal axis represents the voltages Vn of the second pair of electrodes (e.g. 98,100) of the same switch. The output of the leakage detector 76 first is measured at points S0, S1 and S2 as shown on FIG. 8. If the difference between the readings at various points is not significant, the same test is applied to the next switch (e.g. switch 90). If the difference is significant, however, a voltage recomputation process is initiated by adding step increments to the initial voltages for both electrode pairs until a minimum leakage value is found. If no minimum leakage value is found within a prescribed period of time, the voltage recomputation sequence is timed out. The same process is repeated for each of the switches 88, 90 and 92.

FIGS. 4–7 are flow chart representations of the steps performed by the processor 112 in executing the leakage analysis sequence. This sequence may be executed on a periodic basis or with each reading of the output of the primary detector 72. As mentioned, a number of samples of the output of leakage detector 76 are taken before and after an incremental change is made to the voltages applied to each of the switches. In this illustrative embodiment, the number of samples taken is initially set to be 2. The magnitude of the perturbation is defined in terms of units of digital-to-analog counts. The digital-to-analog count is a well understood quantity defined as the voltage corresponding to a maximum analog signal value divided by the number of time slot per unit time. In one embodiment of the invention the initial perturbation value, referred to as dV is equal to 32 counts. Other values for the number of samples and the perturbation voltage may be selected depending on the characteristics of the system and degree of accuracy desired.

Figure 4:
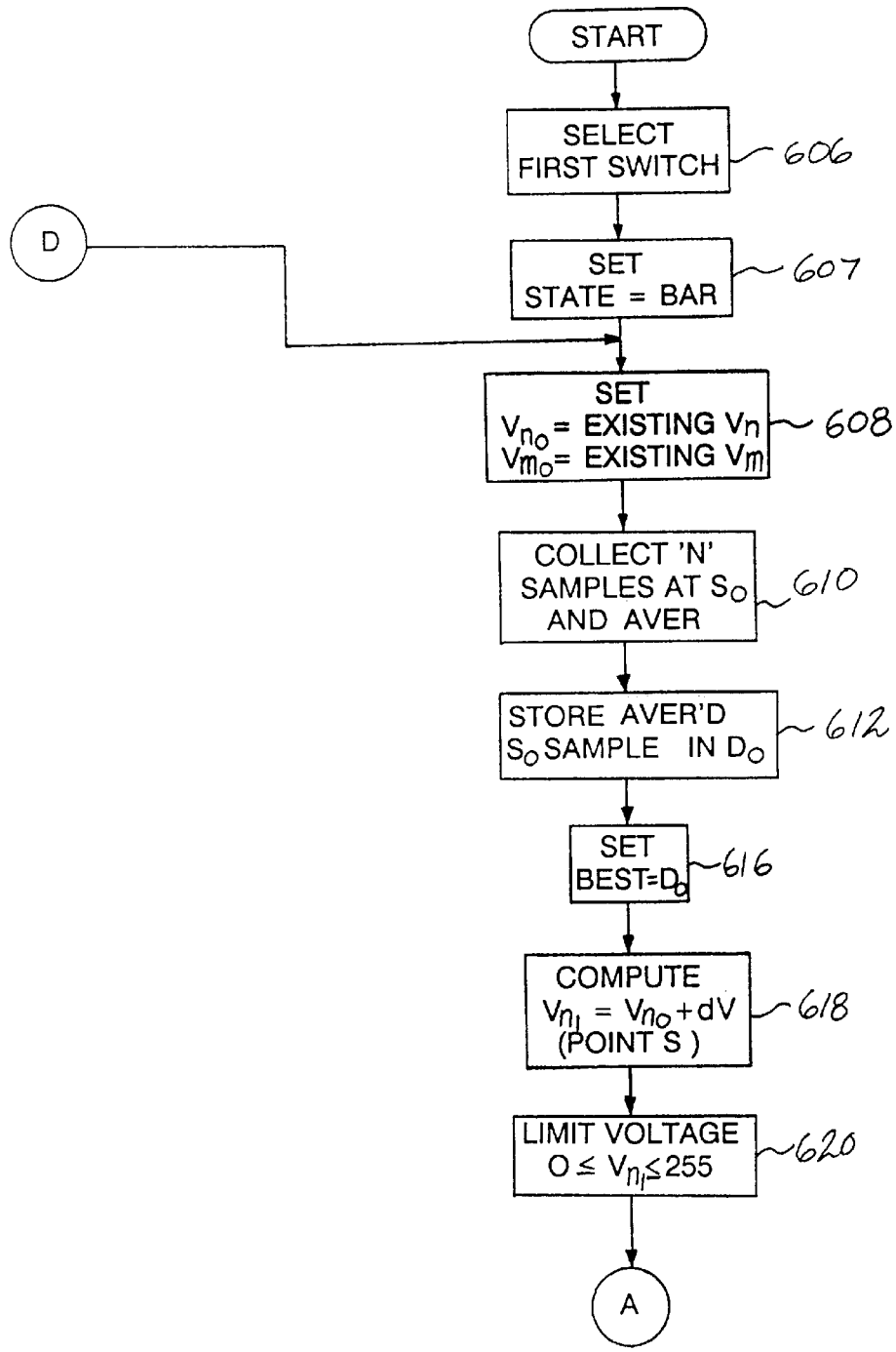
FIGS. 4 through 7 are flow charts illustrating the process for adjusting control voltages for the electro-optical switch array of FIG. 1.

Upon entering the leakage analysis sequence, a first switch (e.g. switch 88) is selected as indicated in block 606 of FIG. 4. As depicted in block 607, a variable called STATE is set to BAR, indicating that the bar state voltages of the switch under test will be analyzed. The bar state and cross state voltages are analyzed separately for each switch. As represented in block 608, voltage values Vno, Vmo defining point S0 of FIG. 8 are set to the exiting values of Vn and Vm. Thereafter, N samples are collected from the leakage detector 76 at the point S0 of FIG. 8. As indicated in block 612, the samples are averaged and stored as D0. A value referred to as BEST is set equal to the averaged value D0, as indicated in Box 616, to record the best obtained leakage value up to this point. Thereafter, a new point S1, shown on the graph of FIG. 8, is defined by adding the quantity dV to the initial value Vno, without changing the value of Vm. In blocks 620 the newly computed voltage level is tested and, if necessary, adjusted to assure that it falls within the range of voltage levels available in the system. The number 255 in block 620 refers to the maximum number of digital-to-analog counts available in this particular embodiment. Special boundary condition procedures, such as reversing the direction of the increment, may be implemented where desired.

Figure 5:
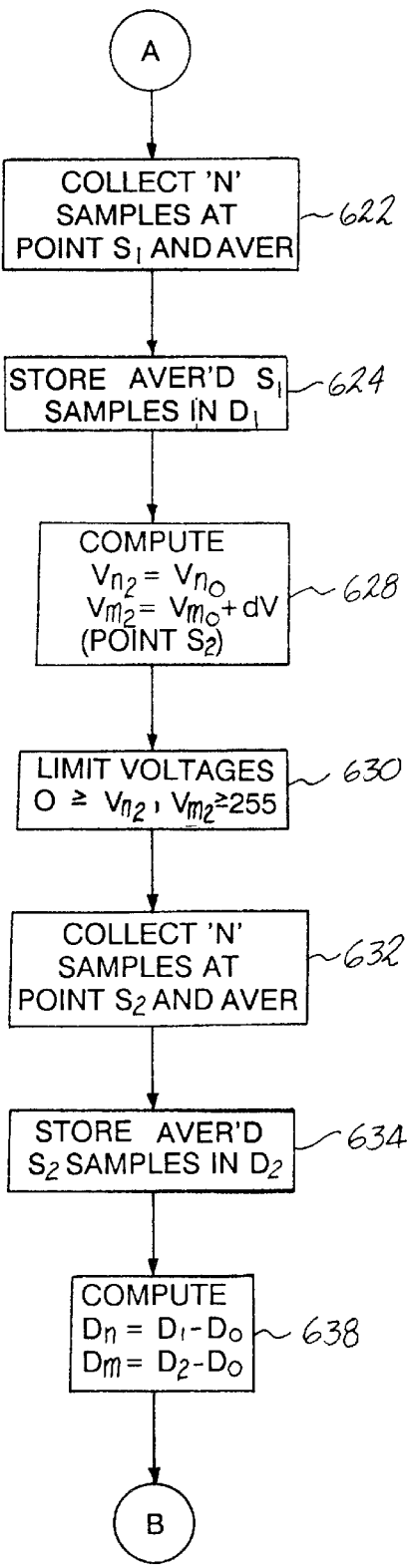
Figure 6:
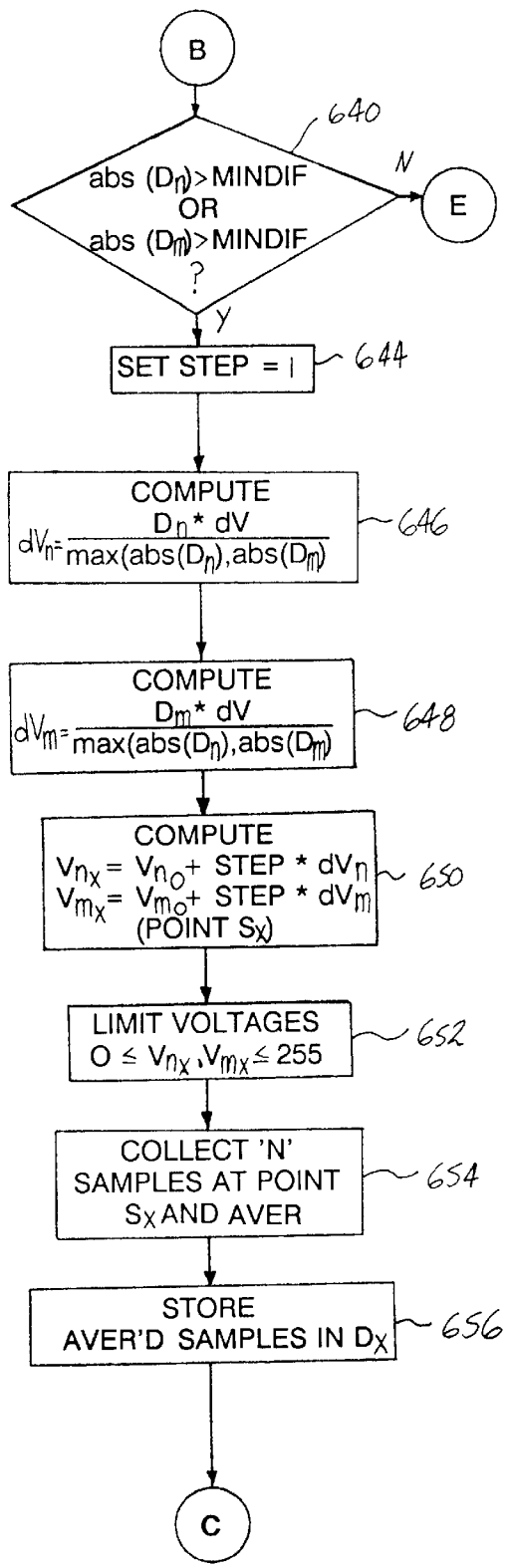

N samples of the leakage detector 76 are collected at the new coordinate point S1 and averaged as indicated in block 622 of FIG. 5. This average is subsequently stored as the quantity D1, is indicated in block 624. Thereafter, the voltages corresponding to new coordinate point S2 of FIG. 8 are computed in block 628. In this case, the Vn coordinate is equal to the initial voltage level Vno and the Vm coordinate is equal to the initial voltage Vmo plus the value dV. The new value of the Vm is tested and, if necessary, adjusted to make sure that it falls within the prescribed voltage limits, as shown in block 630. Thereafter, N samples are collected from the leakage detector 76 at point S2 and averaged, as shown in block 632, and stored as quantity D2, as indicated in block 634. Thereafter, the values of Dn and Dm, representing the difference between the samples collected at S0 and S1 and the difference between S0 and S2, respectively, are computed, shown in block 638.

The computed values of Dn and Dm are compared against a pre-selected minimum difference value, as indicated in block 640, to determine whether the change in leakage output as a result of the excursions from the S0 point indicate a significant gradient. If not, no further action is taken in the leakage analysis sequence with respect to these particular switch voltages. If it is determined that there is a significant gradient, a new value of Vn, Vnx, and a new value of Vm, Vmx, are computed defining a point Sx on the diagram of FIG. 8. The new values of Vn and Vm are computed by multiplying a value dVn and dVm by a selected multiplier and adding the resultant product to Vn0 and Vm0, respectively. The multiplier used in deriving Vnx and Vmx is referred to as STEP. The value of STEP is set to 1 in block 644. The delta voltages dVn and dVm are computed using a well-known integer method, as $$dVn = \frac{Dn \times dV}{\max(\text{abs }(Dn), \text{abs}(Dm))}, \quad dVm = \frac{Dm \times dV}{\max(\text{abs }(Dn), \text{abs }(Dm))},$$

or similar computation. These computations are represented by blocks 646 and 648 in FIG. 6. The delta voltages dVn, dVm correspond to the components of an incremental value by which the switch voltage is to be changed to further minimize the leakage output.

It will be appreciated that an excursion from S0 (FIG. 8) to S1 or S2 can result in an increase or a decrease in the magnitude of the optical output signal value D1, D2. An increased signal value is desired if the output of the primary photodetector is sampled. However, a decreased signal value is desired if leakage detector 76 is monitored. Thus, if an increase in optical output of detector 76 is detected in response to an initial excursion from S0, the next excursion should be in the opposite direction. In that case, the values of Dn, Dm will be negative, as will be the values dVn and dVm computed in block 650.

As depicted in block 650, the computed values of dVm and dVn are multiplied by the value of STEP and added to the initial voltages Vn0 and Vm0 to define new voltages Vnx and Vmx to be applied to the switch being analyzed. As shown in block 652, the new voltages are tested and, if necessary, adjusted to assure that they are within the limits of the system. Thereafter, N samples of the leakage detector 76 are collected at the new point Sx (Vnx, Vmx) and averaged, as shown in block 654, and stored as the value Dx, as shown in block 656.

The difference between the results stored as Dx and the results previously stored as BEST is compared to a predetermined minimum value of MINDIF, as shown in block 658. In the event that the difference between the results obtained at Sx differs significantly less than what was obtained earlier at S1 or S2, the value of BEST is set equal to the value of Dx and the value of STEP is incremented, as indicated in blocks 660 and 662. Thereafter, new values of Vnx and Vmx are computed by multiplying the delta values dVn and dVm by the new value of STEP and adding those quantities to the initial voltage values Vno, Vmo, respectively, to define a further point $Sx^1$, as indicated in block 664. The new value of these voltages is limited, as indicated in block 666 to be within the limits of the system. Thereafter, as indicated in block 668, N samples are again collected and averaged and stored in Dx as indicated in blocks 668 and 670. Unless a time-out has occurred, a return will be made to block 658 to again determine whether the difference between the newly collected samples and the previously stored BEST value is less than MINDIF. If so, the sequence of blocks 650 through 670 will be repeated. In the event that the loop including blocks 660 through 670 is occupied for more than a predefined period of time, e.g. three seconds, an exit is made from the loop to decision block 687, as indicated in block 672.

In the event that no significant difference is detected between the value of the most recently obtained samples and the previously stored value of BEST, an advance is made to block 674 where a new value of STEP is derived by decrementing the present value of STEP by 1. Thereafter, new values of Vn and Vm are computed by adding a multiple of dVn and dVm defined by the new value of STEP to Vn0 and Vm0, respectively, as shown in block 676. The newly derived voltages are again limited to be within the physical range of the equipment, as shown in block 678.

Figure 7:
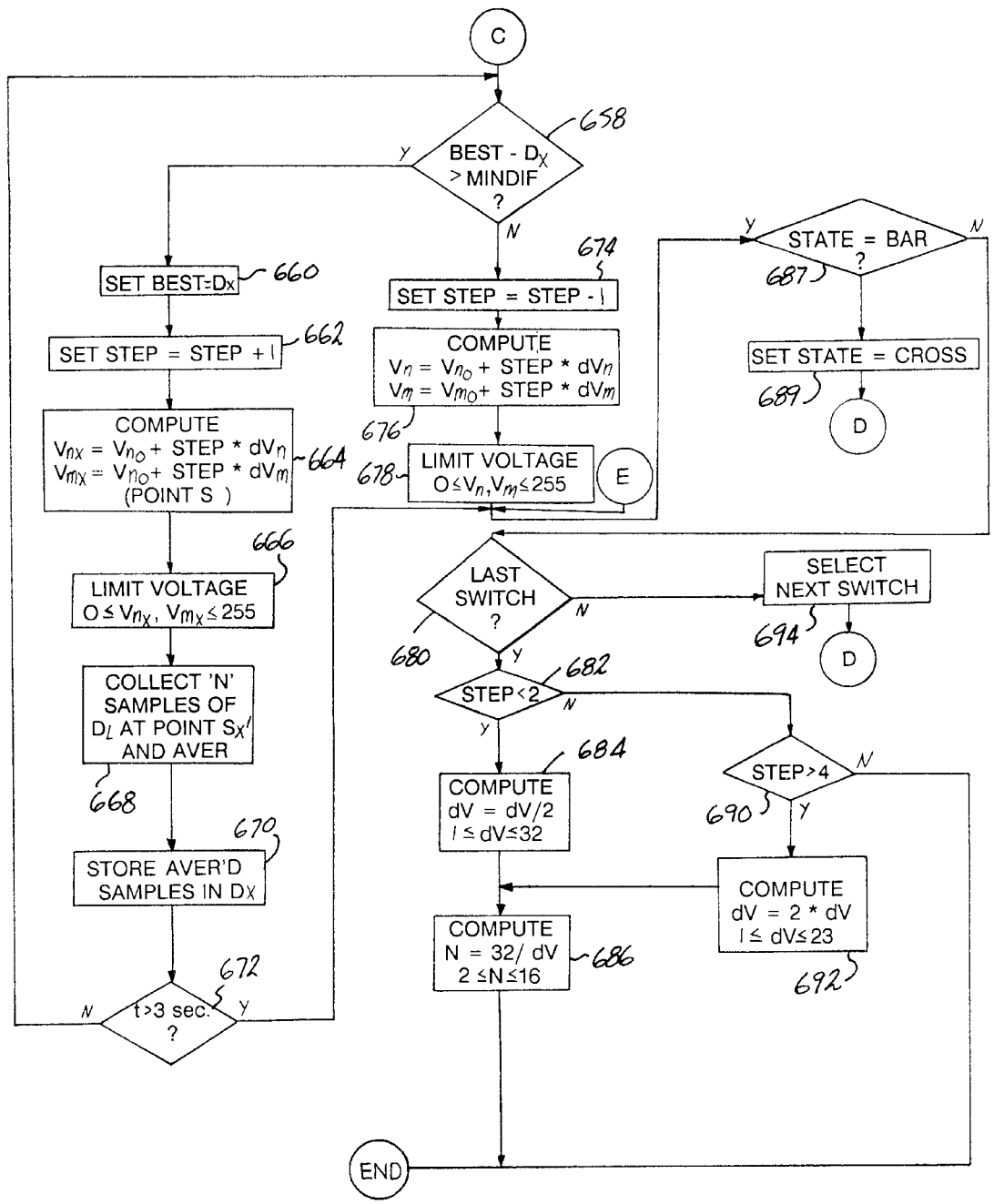

After the new voltages for Vn and Vm have been set, as discussed with reference to block 676 and 678 of FIG. 7, a test is made in block 687 to determine whether an executed analysis pertains to the BAR state or the CROSS state of the switch. If the completed analysis is for the BAR state, and advance is made to block 689 and STATE is set equal to CROSS and the analysis procedure described with respect to blocks 608 through 678 of FIG. 4 through 7, is repeated for the cross state voltages of the same switch. If it is determined in block 687 that STATE is not equal to BAR, meaning that the sequences has been executed with respect to the cross state, an advance is made to block 680 and a test is made to determine whether the switch with respect to which the sequence was executed is the last of the switches of the optical switch array 14. If not, the next one of the switches to be analyzed is selected as indicated in block 694 and a return is made to block 608 to perform the sequence with respect to the selected switch.

In the event that the test in block 680 indicates that the sequence has been executed with respect to all of the switches, the value dV, representing the increments between S0 and S1 and between S0 and S2, is adjusted if the value of STEP is either less than two or greater than four. The value of STEP indicates the number of iterations required to reach a near optimum level of leakage and in the event that fewer than two steps is required to reach that level, the value of the incremental voltage dV is divided by two to obtain greater accuracy, as indicated in block 684. If the number of steps is greater than four, suggesting that a relatively large number of iterations was required to reach the desired level, the incremental voltage value is increased by doubling dV, as indicated in block 690 and 692. If the value of STEP is in the range of two through four, no changes are made to the value dV. In each case, the value of dV which, as indicated earlier, may have been initially set to a value of 32 digital-to-analog counts, is adjusted with each new computation such that dV is not less than one and not greater than 32, as indicated in block 684 and 692. From blocks 684 and 692 the sequence is advanced to block 686. As indicated in block 686, a new value of N, defining the number of sequential samples to be taken at the leakage detector, is adjusted as a function of the newly-computed value of dV by setting N equal to the resultant quotient of dividing the number 32 by the new value of dV. The value of N is limited such that it is not less than two nor greater than 16. At this point, the sequence may be ended and reinitiated on a timed basis at the START position shown in FIG. 4. The new values of dV and N will be used at the next execution of the sequence.

It will be apparent that the sequence outlined in FIGS. 4 through 7 is only exemplary and represents a particular implementation and numerous variations may be introduced in the sequence of FIGS. 4 through 7 to accomplish the same function. Particularly, the steps of modifying the incremental voltage dV and the number of samples obtained N do not necessarily need to be modified in the manner described above. In this particular example, these values are adjusted each time after the three separate switches, 88, 90 and 92, have been analyzed. A similar adjustment could be made after the analysis of each of the individual switches, which may yield a more accurate result.

It will be understood that the above described arrangement is merely illustrative of the application of the principles of the invention and that other arrangements may be devised by those skilled in the art without departing from the spirit and scope of the invention.

What is claimed is:

1. A method of optimizing an optical signal in an electro-optical switch array having a plurality of input and output ports including an optical output signal detection port and comprising a plurality of electro-optical switches responsive to control signals to selectively transmit optical signals among the access ports, the method comprising the steps of:

applying an optical input signal to one of the input ports;

selectively applying control signals of differing magnitudes to the switches;

detecting optical output signals from the detection port and after application of each of the control signals;

storing signal values representative of the detected optical output signals;

defining a preferred signal value for optical output signals and comparing the stored signal values to the preferred value;

selecting a control signal magnitude substantially equal to the magnitude of applied control signals resulting in optical output signal levels most nearly equal to the preferred value; and subsequently applying control signals of the selected magnitude.

2. The method in accordance with claim 1 and further comprising the step selecting one of the switches and wherein the control signals of differing magnitudes are applied only to the selected switch in the step of sequentially applying a plurality control signals and wherein control signals of the selected magnitude are subsequently applied to the selected switch.

3. The method in accordance with claim 2 wherein the method is individually performed for each of the plurality of switches.

4. The method in accordance with claim 1 wherein the switch array comprises an optical leakage detection output port and wherein the optical output signals are detected from the leakage detector and wherein the preferred signal value is defined as zero and the step of selecting comprises selecting a signal magnitude substantially equal to the magnitude of control signals resulting in the lowest leakage value detected from the optical leakage detection output port.

5. The method in accordance with claim 1 wherein the detected optical output signals are primary optical signals and wherein the preferred signal value is defined as a maximum signal and the step of selecting comprises selecting a signal magnitude substantially equal to the magnitude of control signals resulting in a maximum magnitude optical output signal.

6. A method of optimizing an optical signal in an electro-optical switch array having a plurality of switch access ports and comprising a plurality of switches optically connected to the access ports, each of the switches responsive to control signals to selectively transmit optical signals among the access ports, the method comprising the steps of:

applying an optical input signal to one of the switch access ports;

selectively applying control signals to each of the switches, each of the control signals having a predetermined magnitude;

detecting a first optical output sample from an other of the switch access ports and storing a signal value representative of the first sample;

selecting one of the switches;

modifying the magnitude of control signals for the selected switch by a predetermined value and applying the control signals of the modified magnitude to the selected switch;

detecting a second optical output sample from the other of the access ports and storing a signal value representative of the second sample;

computing of the difference between the stored signal values representative of the first and second samples;

adjusting the magnitude of control signals for the selected switch by an incremental value proportional to the difference between the stored signal values of the first and second samples.

7. The method in accordance with claim 6 in an electro-optical switch in which each of the plurality of switches comprises first and second switch electrodes responsive to first and second control signals, respectively, and wherein the step of modifying comprises modifying the magnitude of the first control signal for the selected switch and the step of adjusting comprises adjusting the magnitude of the first control signal for the selected switch.

8. The method in accordance with claim 7 and wherein the step of modifying further comprises the step of modifying the magnitude of second control signal for the selected switch and the step of adjusting the magnitude of the second control signal for the selected switch.

9. The method in accordance with claim 8 wherein the step of modifying the magnitude of the first control signal comprises adding a predetermined incremental value to the predetermined magnitude of the first control signal.

10. The method in accordance with claim 9 and further comprising the step of setting the magnitude of the first control signal to the value of the predetermined magnitude and wherein the step of modifying the magnitude of the second control signal comprises adding the predetermined incremental value to the predetermined magnitude of the second control signal.

11. The method in accordance with claim 10 and further comprising the step of detecting a third optical output sample from the other of the switch access ports and storing a signal value representative of the value of the third sample and the step of computing the difference between the values of the first and the third samples and the step of adjusting the magnitude of the first control signal by first incremental value computed as a function of the difference between the signal values representative of the first and second samples and the step of adjusting the magnitude of the second control signal by a second incremental value computed as a function of the difference between the signal values representative of the first and third samples.

12. The method in accordance with claim 11 and further comprising the step of detecting an additional sample after the steps of incrementing the magnitude of the first and second control signals by the first and second incremental values and the step of storing signal values representative of the additional sample and the step of comparing the difference between signal values representative of the third sample and the additional sample with a predetermined threshold value and the step of incrementing the values of the first and second control signals by first and second additional incremental values computed by multiplying the first and second incremental values by a selected multiplier.

13. The method in accordance with claim 12 and further comprising the step of repeatedly incrementing the selected multiplier and repeatedly collecting additional samples and storing values representative of the additional samples until the difference between successively collected samples is less than the predetermined threshold value.

14. The method in accordance with claim 13 and further comprising the step of adjusting the predetermined value for modifying the magnitude of the control signals is modified in accordance with the value of the selected multiplier.

15. The method in accordance with claim 6 wherein the steps of detecting and storing comprises collecting a plurality of samples of leakage output and storing a signal value representative of the plurality of collected samples.

16. An optical switching system comprising:

an electro-optical switch array comprising a plurality of switch access ports and an optical leakage detection port, the switch array further comprising a plurality of switching elements each responsive to electrical control signals of a first type to assume a first operational state and responsive to control signals of a second type to assume a second operational state;

an optical leakage detector connected to the optical port for generating electrical output signals representative of optical leakage in the switch array; and control circuitry connected to the switch array and the detector and operative to selectively apply electrical control signals of the first type and the second type and of predetermined magnitudes to the switch array, the control circuitry responsive to the electrical output signal representative of optical leakage to adjust the magnitudes of the controlled signals to reduce optical leakage in the switch array.

17. The system in accordance with claim 16 and further comprising a filter circuit connected between the optical leakage detector and the control circuitry for filtering electrical signals of greater than a predetermined frequency from the electrical output signals generated by the optical leakage detector.

18. The system in accordance with claim 17 and further comprising electrical output circuitry responsive to control signal from the control circuitry to selectively transmit control signals of the first type and of predetermined magnitudes and of the second type and of predetermined magnitudes to each of the plurality of switching elements on a periodic basis and comprising circuitry defining the predetermined magnitudes including a first signal source element generating output signals of a fixed magnitude and a second signal source element generating signals of a second variable magnitude and circuitry for combining the signals generated by the first and second signal source elements.

19. The system in accordance with claim 18 wherein the control circuitry generates magnitude modifying control signals and wherein the second signal source elements are responsive to the magnitude modifying control signals, whereby magnitudes of control signals of the first and of the second type are adjusted under control of the controlled circuitry in response to optical leakage signals representative of optical leakage in the switch array.

* * * * *